United States Patent
Allard et al.

(10) Patent No.: US 12,385,797 B2
(45) Date of Patent: Aug. 12, 2025

(54) PRESSURE SENSOR HUB FOR A VACUUM-INSULATED STRUCTURE

(71) Applicant: WHIRLPOOL CORPORATION, Benton Harbor, MI (US)

(72) Inventors: Paul Bennett Allard, Coloma, MI (US); Wesley J. Aurand, Niles, MI (US); Gregory Edward Bauman, Stevensville, MI (US); Sunil S. Ekshinge, Pune (IN); Sanket V. Phalak, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 335 days.

(21) Appl. No.: 18/110,968

(22) Filed: Feb. 17, 2023

(65) Prior Publication Data

US 2024/0280429 A1 Aug. 22, 2024

(51) Int. Cl.
*G01L 19/14* (2006.01)
*G01L 19/00* (2006.01)

(52) U.S. Cl.
CPC ........ *G01L 19/148* (2013.01); *G01L 19/0069* (2013.01)

(58) Field of Classification Search
None
See application file for complete search history.

(56) References Cited

U.S. PATENT DOCUMENTS

| | | | |
|---|---|---|---|
| 3,655,939 A * | 4/1972 | Stromquist | H05B 1/0236 219/218 |
| 5,351,550 A | 10/1994 | Maurer | |
| 10,781,094 B2 | 9/2020 | Guilardi | |
| 12,038,340 B2 * | 7/2024 | Allard | G01L 19/147 |
| 2009/0205861 A1 | 8/2009 | Stegmaier et al. | |
| 2011/0148649 A1 * | 6/2011 | de Cavalcanti | H01R 13/6683 307/104 |
| 2011/0153739 A1 * | 6/2011 | McCoy | H01R 13/7031 709/204 |
| 2017/0159998 A1 | 6/2017 | Dherde et al. | |
| 2019/0106322 A1 | 4/2019 | Do et al. | |
| 2021/0088403 A1 | 3/2021 | Allard et al. | |
| 2021/0148113 A1 | 5/2021 | Allard et al. | |
| 2022/0055262 A1 | 2/2022 | Bauman et al. | |

FOREIGN PATENT DOCUMENTS

JP 2012136254 A 7/2012
WO 2012017903 A1 2/2012

* cited by examiner

*Primary Examiner* — Peter J Macchiarolo
*Assistant Examiner* — Jermaine L Jenkins
(74) *Attorney, Agent, or Firm* — Price Heneveld LLP

(57) ABSTRACT

A pressure sensor hub for a vacuum-insulated structure includes: (a) a pressure sensor, the pressure sensor including a sensing element and an electrical connector extending from the sensing element; (b) a printed circuit board including conductive pads that are exposed, each of the conductive pads in electrical communication with a different portion of the electrical connector of the pressure sensor; and (c) a body that supports the pressure sensor and the printed circuit board.

20 Claims, 15 Drawing Sheets

PRESSURE SENSOR HUB FOR A VACUUM-INSULATED STRUCTURE

BACKGROUND OF THE DISCLOSURE

The present disclosure generally relates to vacuum-insulated structures for appliances and, more specifically, to a pressure sensor hub associated with a vacuum-insulated structure that allows a pressure within the vacuum-insulated structure to be determined.

SUMMARY OF THE DISCLOSURE

A refrigerator could include a vacuum-insulated door, such as for use with a vacuum-insulated cabinet structure. The door could include an interior space that is evacuated and sealed, thus forming a low pressure volume (e.g., near vacuum) within the interior space of the door. Insulation material may be disposed in the interior space. The door can include a pressure sensor placed in communication with the interior space. The pressure sensor can be placed in communication with a processor. The pressure sensor could provide input to the processor, which can determine the pressure within the low pressure volume during manufacture of the vacuum-insulated door and after manufacture during the service life of the refrigerator.

There is a general need to permit the pressure sensor to detect pressure of the low pressure volume while allowing the pressure sensor to communicate with the processor without breaking the low pressure volume. Further, there is a general need to facilitate communication between the pressure sensor and the processor, sometimes without including a wire harness.

The present disclosure addresses those general needs by equipping the vacuum-insulated structure (such as the vacuum-insulated door) with a pressure sensor hub that includes a pressure sensor positioned to read the pressure within the interior space and a printed circuit board with conductive pads in communication with the pressure sensor. The conductive pads are accessible from outside of the insulated structure and the pressure sensor hub. An electrical probe in communication with the processor can make an electrical connection with the pressure sensor via touching the conductive pads at the printed circuit board. The connection with, and receipt of output from, the pressure sensor can thus be made very quickly, in an automated manner, and more quickly than a plug-in type connection with a wire harness. However, the printed circuit board can further include other forms of electrical connector receivers to form a connection with the pressure sensor, such as the aforementioned plug-in type of connection.

According to one aspect of the present disclosure, a pressure sensor hub for a vacuum-insulated structure comprises: (a) a pressure sensor, the pressure sensor comprising a sensing element and an electrical connector extending from the sensing element; (b) a printed circuit board comprising one or more conductive pads that are exposed, each of the one or more conductive pads in electrical communication with a different portion of the electrical connector of the pressure sensor; and (c) a body that supports the pressure sensor and the printed circuit board.

According to another aspect of the present disclosure, a refrigerator comprises: (a) a vacuum-insulated structure comprising a first liner, a second liner opposing the first liner, a space disposed between the first liner and the second liner, wherein an air pressure within the space is less than atmospheric air pressure; and (b) a pressure sensor hub disposed on the first liner, the pressure sensor hub comprising (i) a pressure sensor in fluid communication with the space between the first liner and the second liner, (ii) a printed circuit board in electrical communication with the pressure sensor, and (iii) a body that supports the pressure sensor and the printed circuit board, wherein, the pressure sensor is configured to generate an electrical signal that varies as a function of the air pressure within the space.

These and other features, advantages, and objects of the present disclosure will be further understood and appreciated by those skilled in the art by reference to the following specification, claims, and appended drawings.

Figure 1:
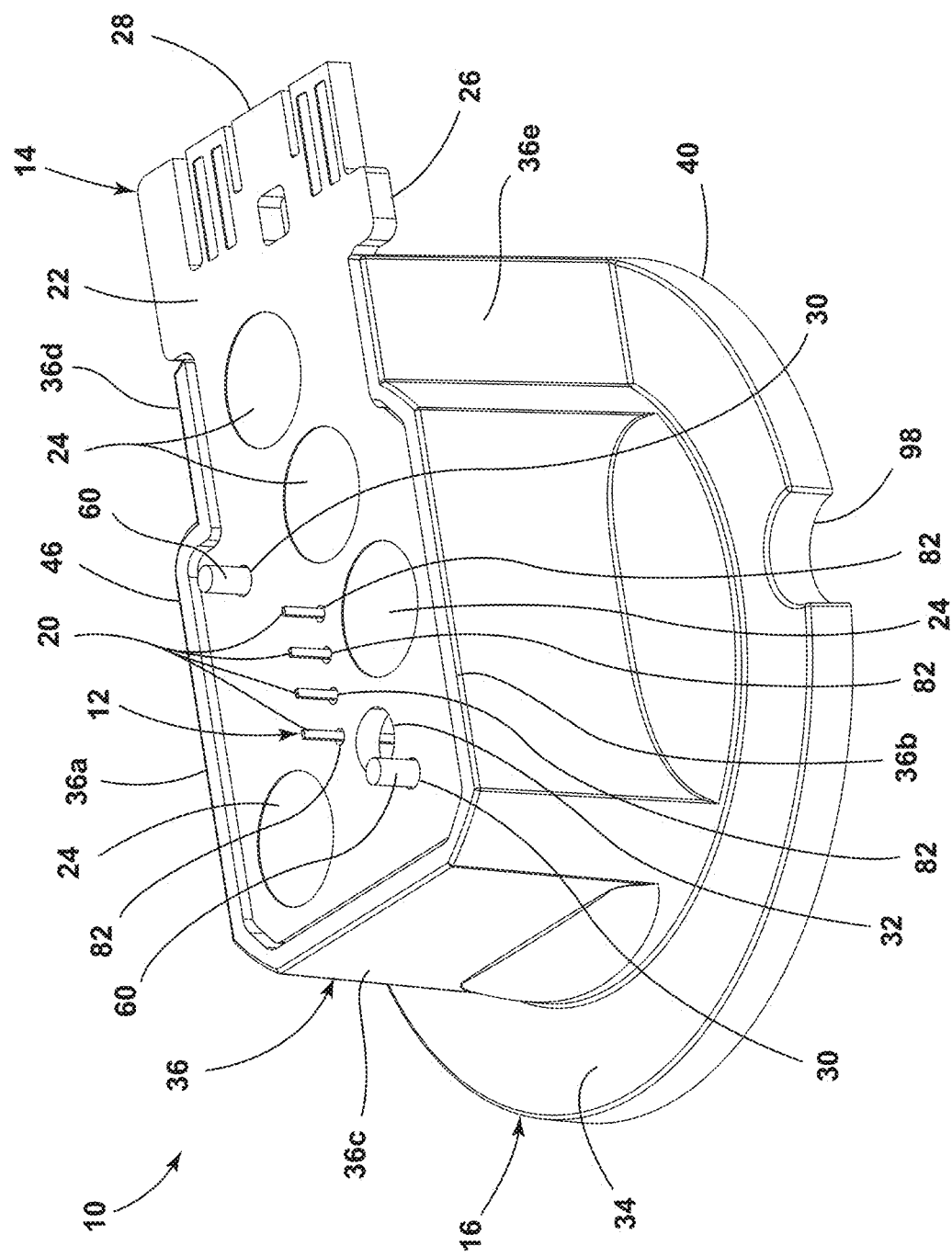
FIG. 1 is a perspective view of a pressure sensor hub of the present disclosure, illustrating the pressure sensor hub including a body and a printed circuit board attached to the body with conductive pads exposed to an external environment.

The components in the figures are not necessarily to scale, emphasis instead being placed upon illustrating the principles described herein.

DETAILED DESCRIPTION

The present illustrated embodiments reside primarily in combinations of apparatus components related to a vacuum-insulated structure. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that an article or apparatus that comprises a list of elements does not include only those elements but may include other elements not expressly listed or inherent to such an article or apparatus. An element preceded by "comprises a . . . " does not, without more constraints, preclude the existence of additional identical elements in the article or apparatus that comprises the element.

Figure 2:
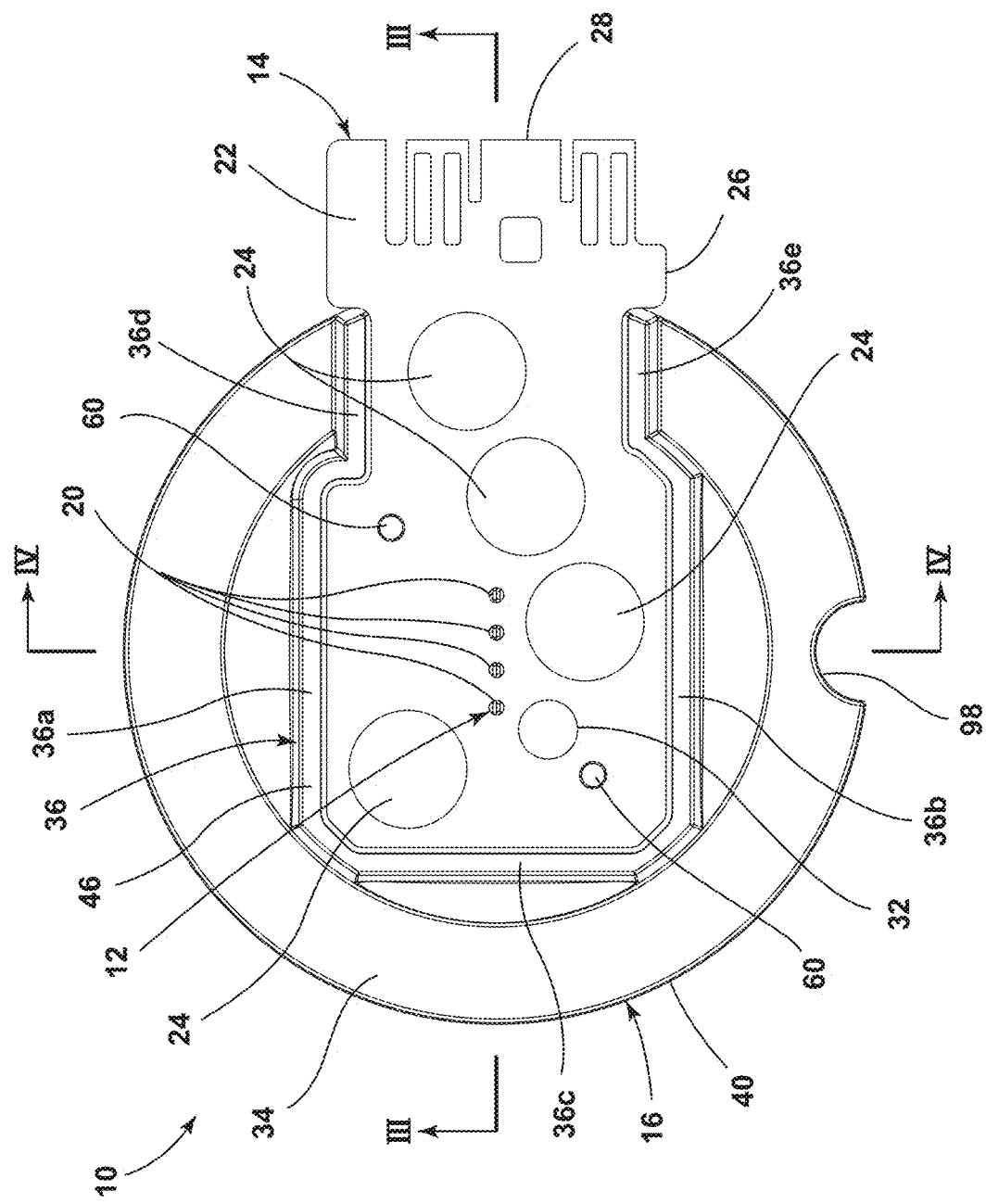
FIG. 2 is a top view of the pressure sensor hub of FIG. 1, illustrating the printed circuit board further including an edge connector when the body further includes heat stake posts that extend through apertures through the printed circuit board to secure the printed circuit board to the body.
Figure 3:
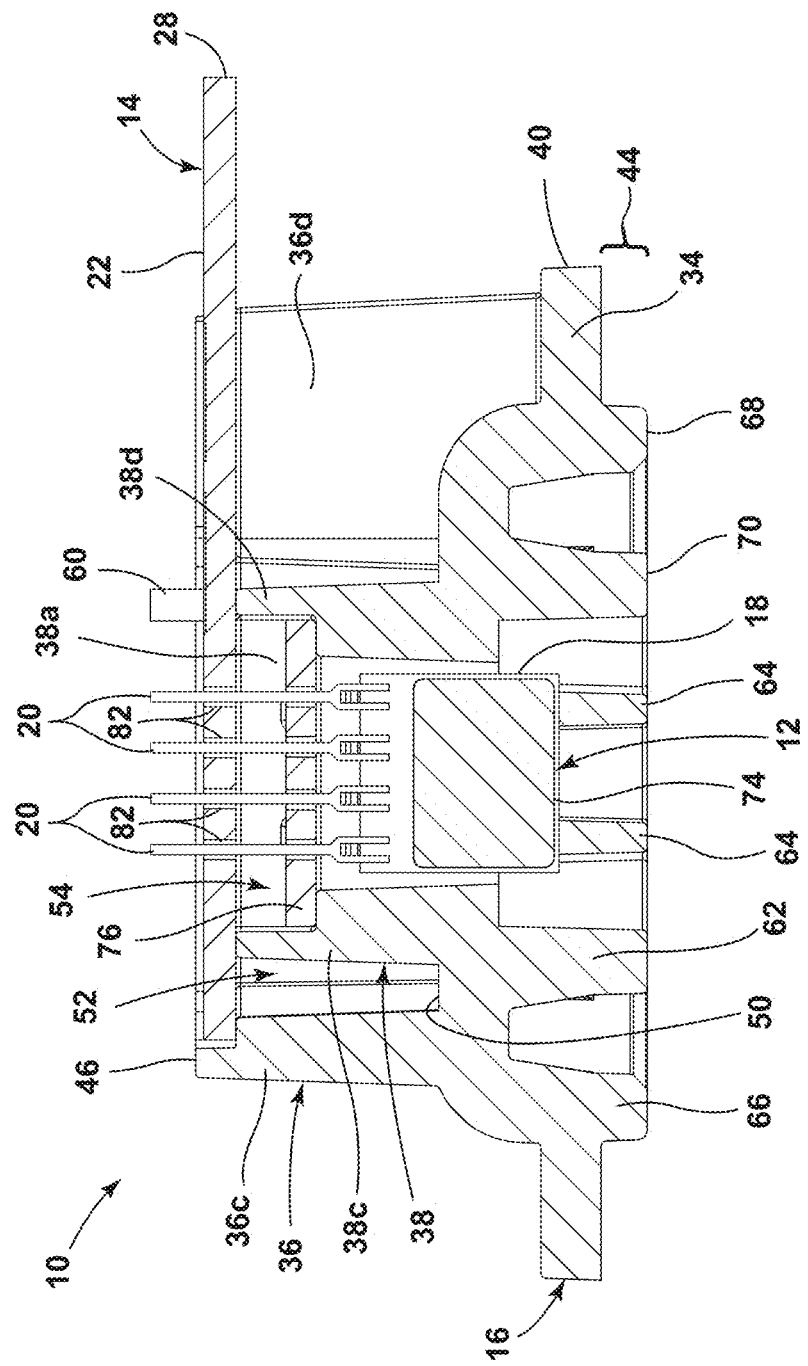
FIG. 3 is an elevation view of a cross-section of the pressure sensor hub of FIG. 1 taken through line III-III of FIG. 2, illustrating the pressure sensor hub further including a pressure sensor with a sensing element disposed within an inner chamber that the body forms.
Figure 4:
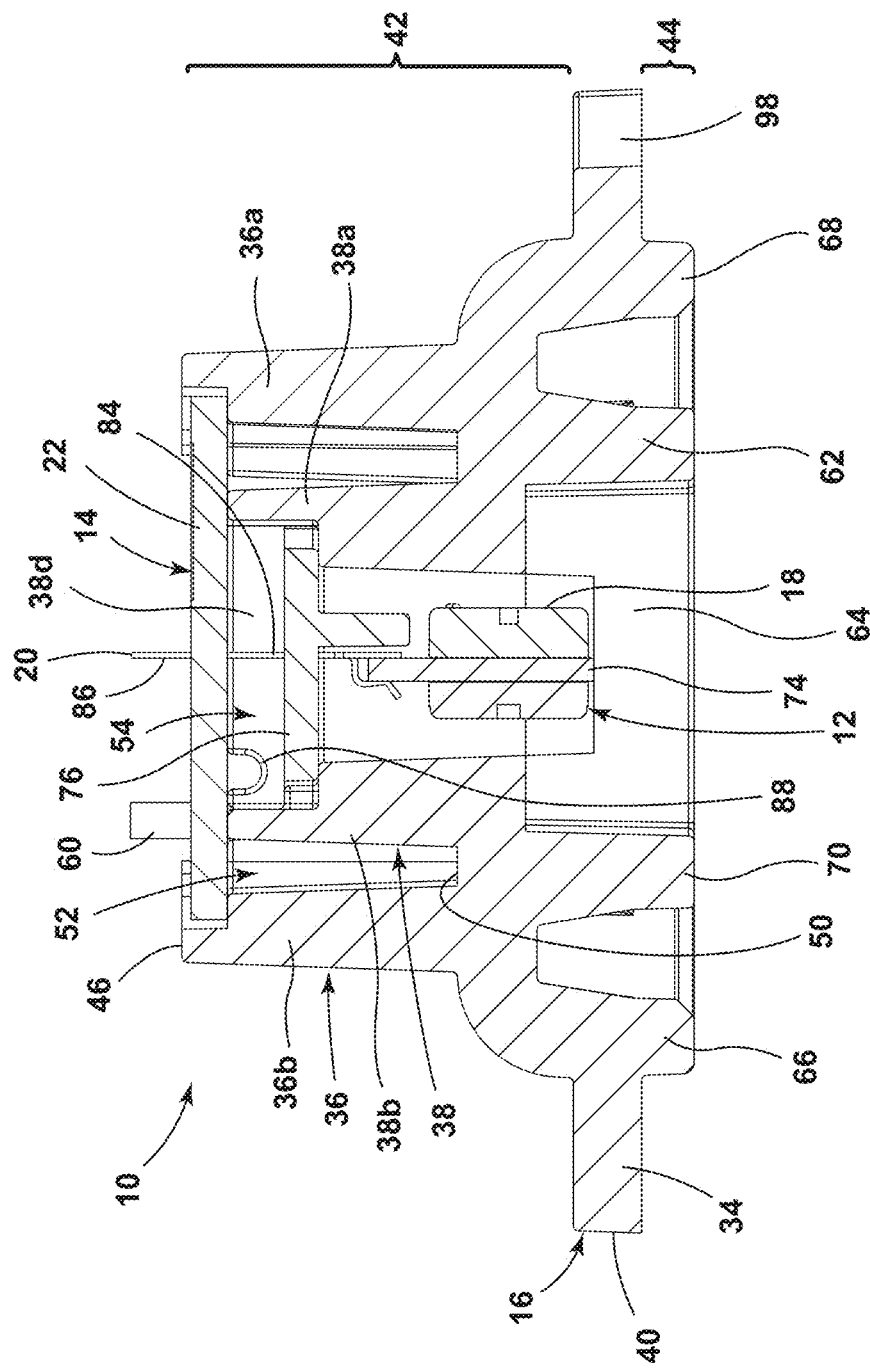
FIG. 4 is an elevation view of a cross-section of the pressure sensor hub of FIG. 1 taken through line IV-IV of FIG. 2, illustrating an electrical connector of the pressure sensor extending to and forming an electrical connection with the printed circuit board.
Figure 5:
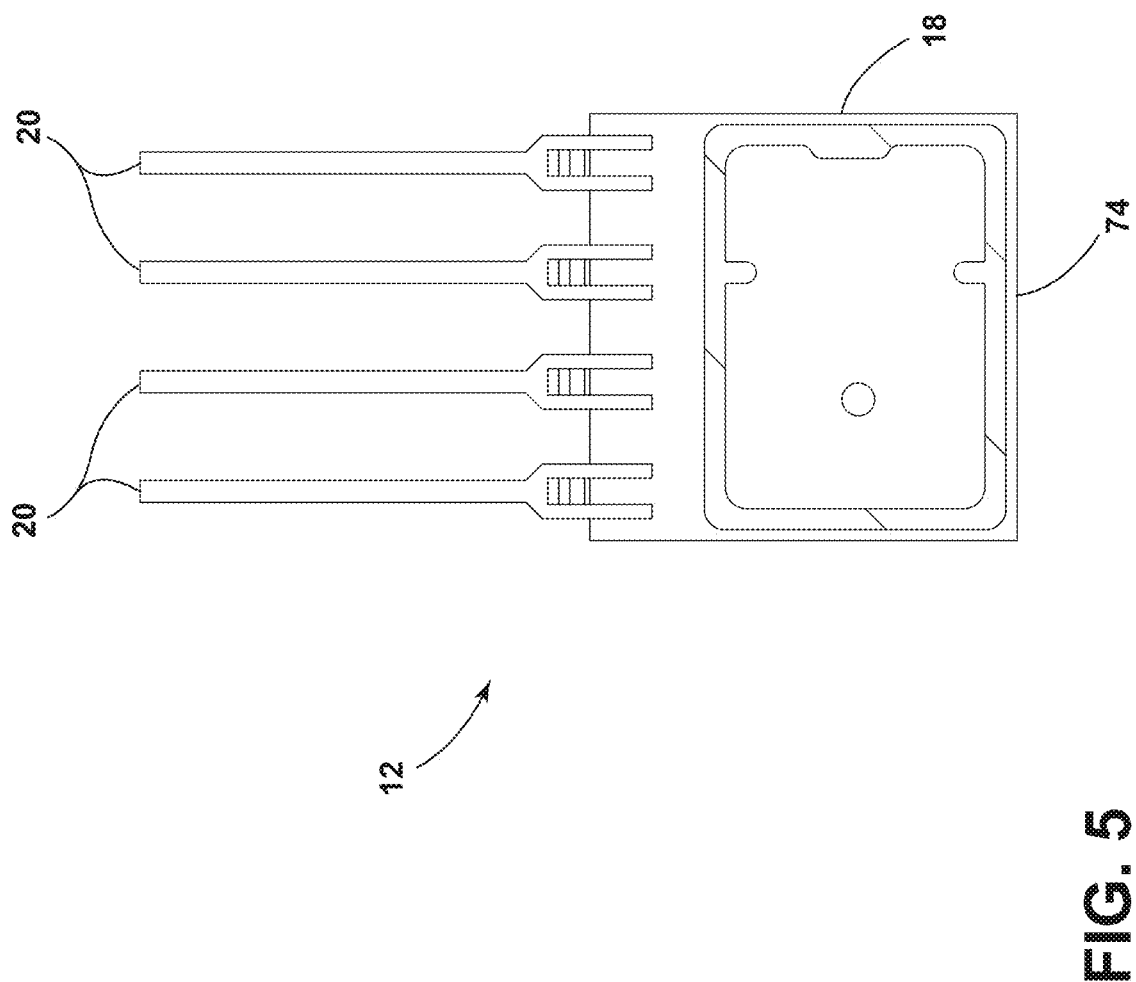
FIG. 5 is a top view of the pressure sensor of FIG. 3.
Figure 6:
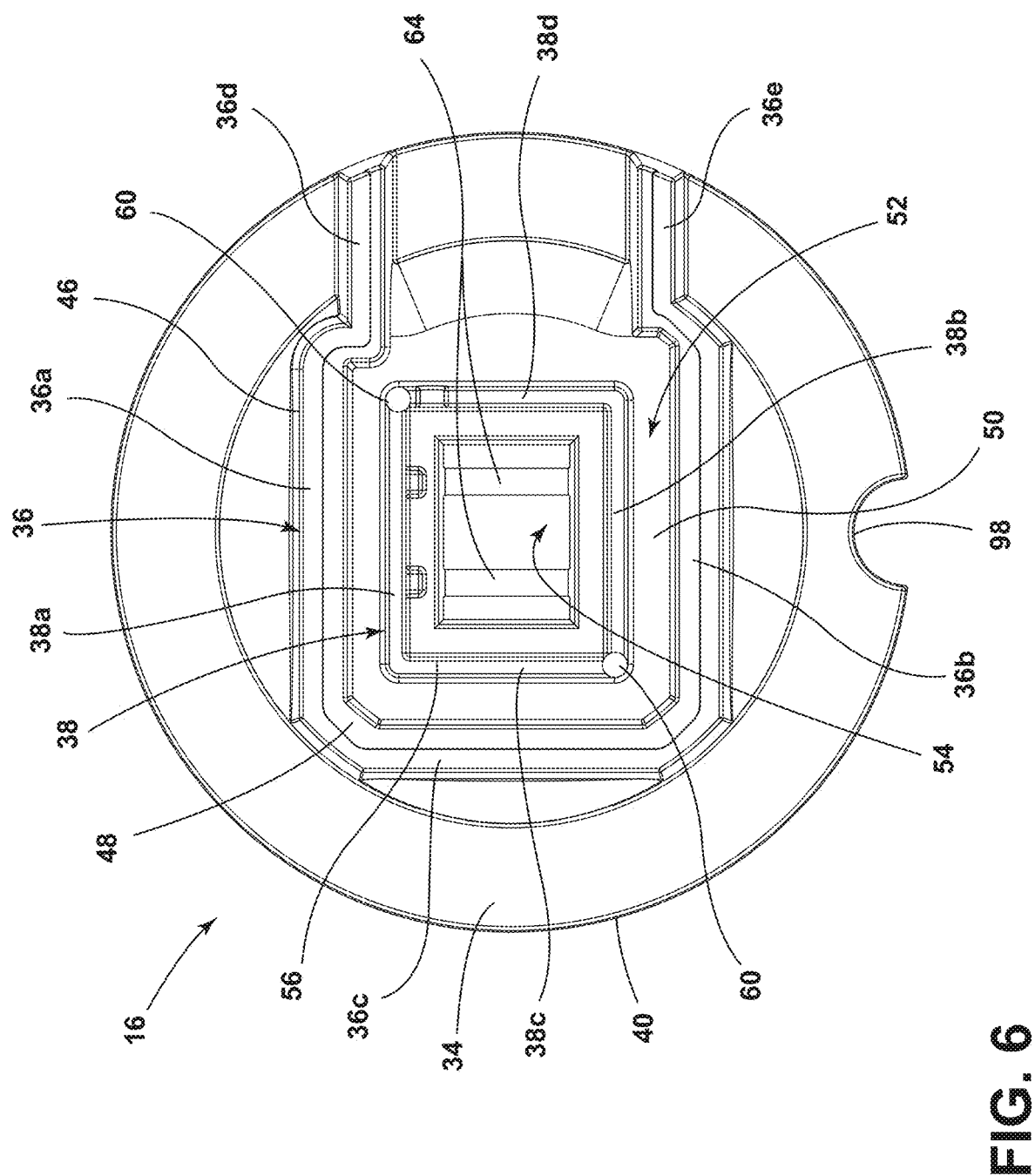
FIG. 6 is the top view of the body of the pressure sensor hub of FIG. 1, illustrating the body including an outer wall system with a ledge to support the printed circuit board and an inner wall system partially surrounded by the outer wall system, the inner wall system at least partially defining the inner chamber within which the pressure sensor is disposed.
Figure 7:
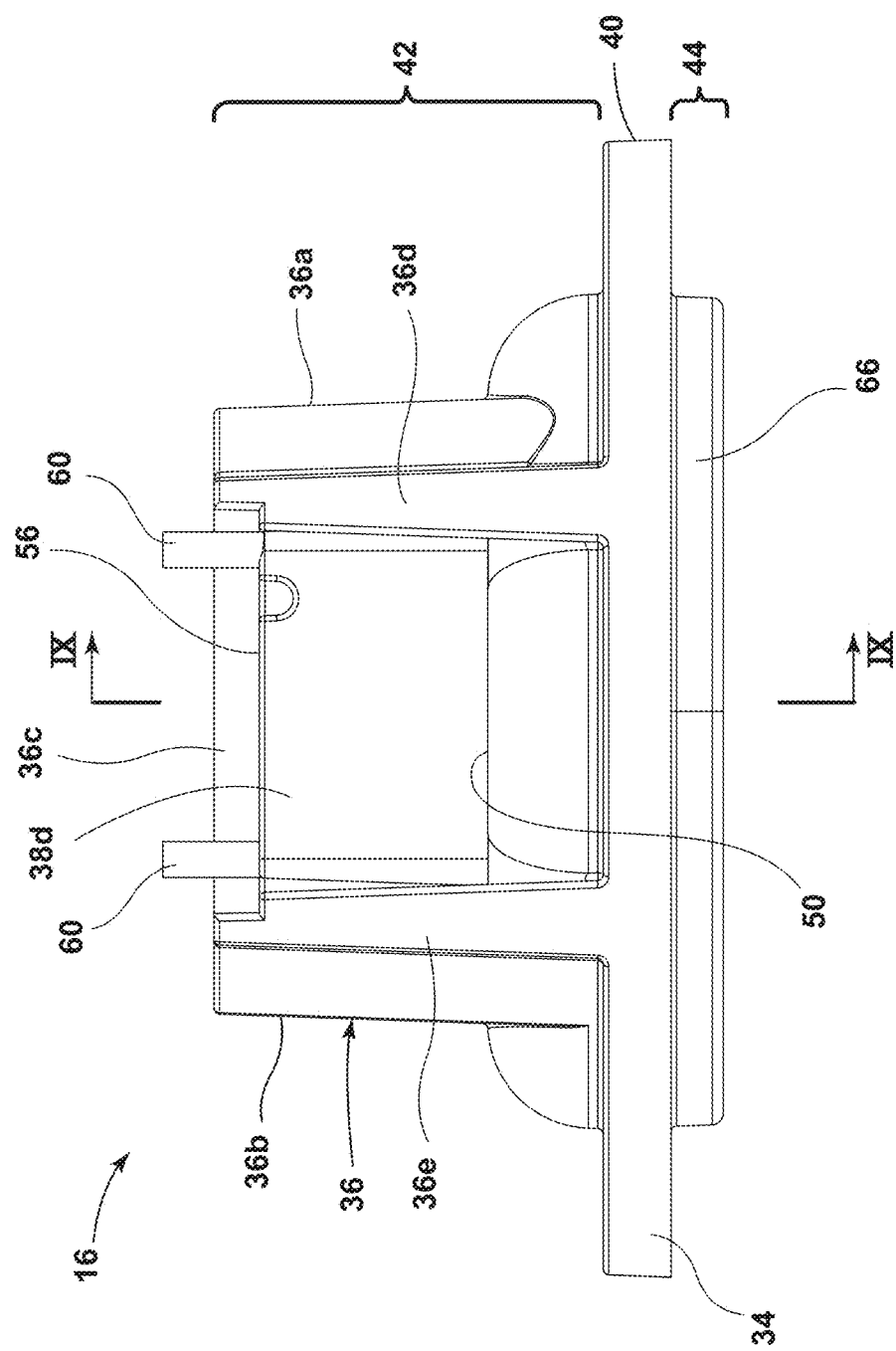
FIG. 7 is an elevation view of the body of the pressure sensor hub of FIG. 1, illustrating the inner wall system of the body having an edge that is distanced from a floor less than an edge of the outer wall system of the body is distanced from the floor.
Figure 8:
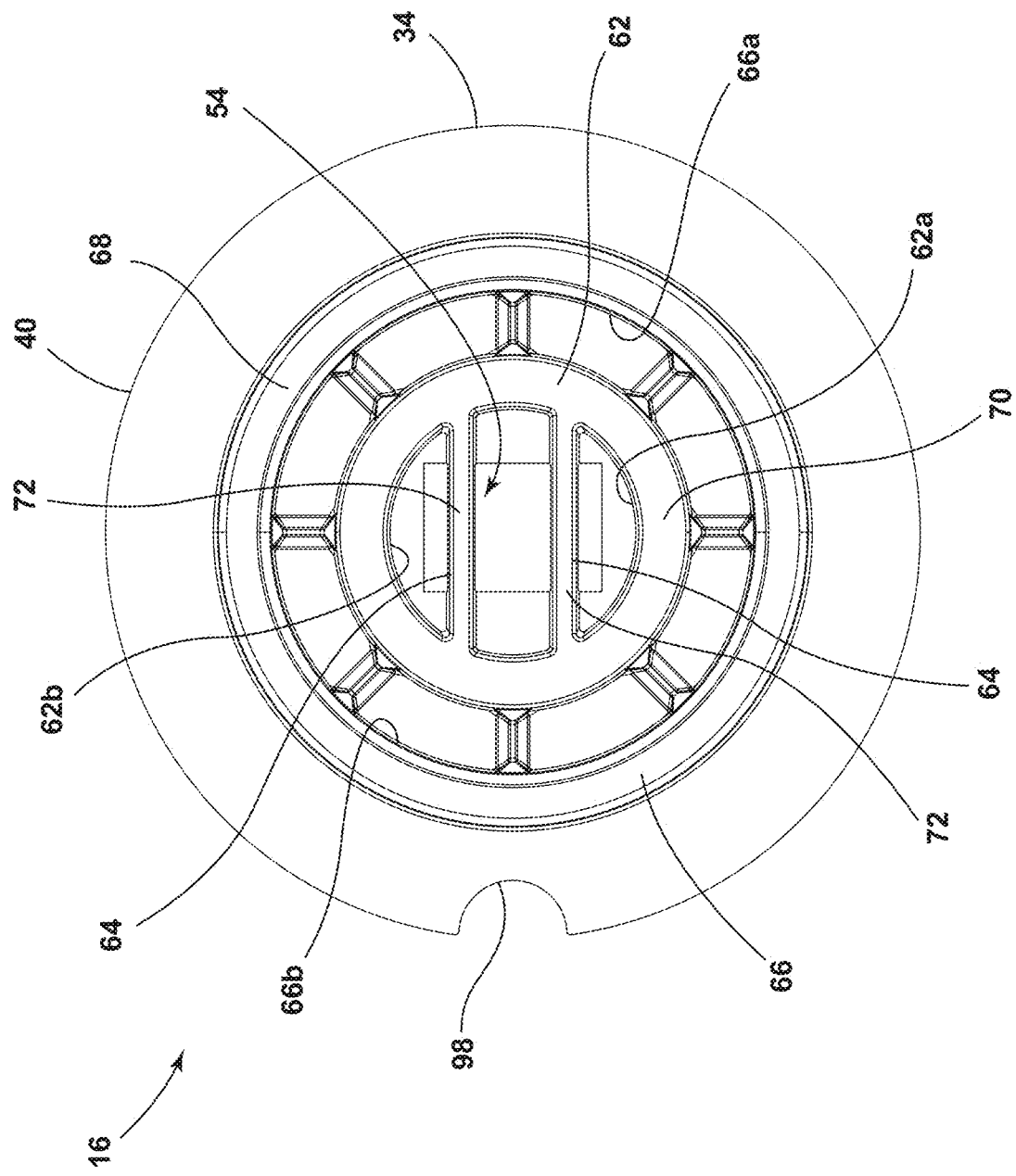
FIG. 8 is an underside view of the body of the pressure sensor of FIG. 1, illustrating the body further including a second outer wall system surrounding a second inner wall system, with the second inner wall system further defining the inner chamber, which extends through the body.
Figure 9:
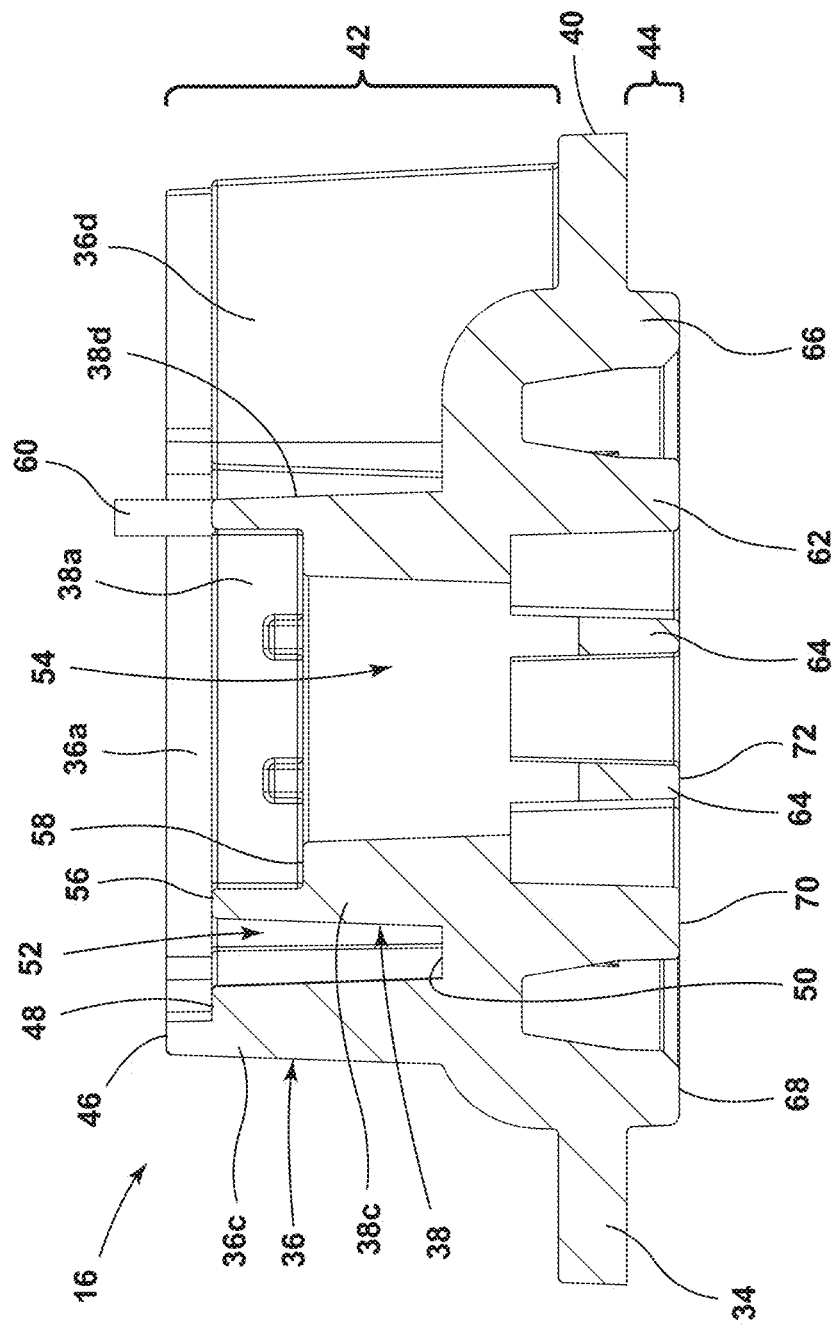
FIG. 9 is an elevation view of a cross-section of the body of the pressure sensor hub of FIG. 1, illustrating heat stake posts extending from the inner wall system.

Referring to FIGS. 1-3, a pressure sensor hub 10 includes a pressure sensor 12, a printed circuit board 14, and a body 16 that supports the pressure sensor 12 and the printed circuit board 14. The pressure sensor 12 (see FIG. 2) includes a sensing element 18 and an electrical connector 20 extending from the sensing element 18. The sensing element 18 can include a piezoresistive, capacitive, or piezoelectric element. The sensing element 18 can include a reference chamber, a transducer, a housing, among other features. The sensing element 18 senses the pressure and converts it into an electrical signal. The electrical connector 20 permits the transmission of the electrical signal from the sensing element 18. The electrical connector 20 can take the form of leads, as in the illustrated embodiments.

The printed circuit board 14 (see FIG. 1) includes a substrate 22 and one or more conductive pads 24 supported by the substrate 22. The substrate 22 can be made of any suitable materials, such as paper phenolic or epoxy. The printed circuit board 14 is in electrical communication with the pressure sensor 12. In embodiments, each of the one or more conductive pads 24 is in electrical communication with a different portion (e.g., a different lead) of the electrical connector 20 of the pressure sensor 12. The printed circuit board 14 further includes conductive traces (not separately illustrated) that electrically connect each of the one or more conductive pads 24 to a different portion of the electrical connector 20 of the pressure sensor 12. For example, one of the conductive pads 24 can be in communication with the ground of the pressure sensor 12, another one of the conductive pads 24 can be in communication with (e.g., provides) the supply voltage of the pressure sensor 12, and another one of the conductive pads 24 can be in communication with (e.g., receives) the signal voltage of the pressure sensor 12, and so on. The one or more conductive pads 24 (and the conductive traces) can be formed of any suitably conductive material, such as copper. The one or more conductive pads 24 are exposed, which allows for a selective electrical connection to be made as further discussed below. The printed circuit board 14 has a perimeter 26. In embodiments, the printed circuit board 14 further includes an edge connector 28. Conductive traces in electrical communication with the pressure sensor 12 are also exposed at the edge connector 28. The edge connector 28 allows for a card edge connector of a wire harness (not illustrated) to make a physical and an electrical connection thereto. The printed circuit board 14 further includes heat stake apertures 30 and a glue aperture 32. The heat stake apertures 30 and the glue aperture 32 are through the substrate 22. Other forms of connectors, such as receptive connectors to receive plug-in types of connectors, can be utilized other than the edge connector 28 to provide an electrical connection with the pressure sensor 12 aside from the one or more conductive pads 24.

Referring now additionally to FIGS. 4-9, the body 16 includes an outer flange 34, an outer wall system 36, and an inner wall system 38. The outer flange 34 defines a perimeter 40 of the pressure sensor hub 10. In addition, the outer flange 34 defines a first side 42 of the body 16 and a second side 44 of the body 16 that faces away from the first side 42.

The outer wall system 36 extends from the outer flange 34 at the first side 42 of the body 16, that is, away from the second side 44 of the body 16. The outer wall system 36 is a system of one more contiguous outer walls 36. The outer wall system 36 extends substantially orthogonally from the outer flange 34. In embodiments, such as those illustrated, the outer wall system 36 includes two outer walls 36a, 36b that are spaced apart from each other and opposing each other and an outer wall 36c generally orthogonal to the two outer walls 36a, 36b. Further, the outer wall system 36 includes an edge 46 furthest from the outer flange 34 and a ledge 48 proximate the edge 46. The ledge 48 is disposed inward from the edge 46. The body 16 further includes a floor 50 inward of the outer wall system 36. The floor 50 and the outer wall system 36 together define an outer chamber 52 of the body 16. The floor 50 is contiguous with the outer flange 34. The outer wall system 36 can include additional outer walls 36d, 36e that extend to the perimeter 40 defined by the outer flange 34.

The inner wall system 38 extends from the floor 50 away from the second side 44 of the body 16 within the outer chamber 52. The outer wall system 36 surrounds the inner wall system 38. The inner wall system 38 extends substantially orthogonally from the floor 50. The inner wall system 38 includes contiguous inner walls 38 that define an inner chamber 54. For example, as in the illustrated embodiments, the inner wall system 38 includes inner walls 38a, 38b that oppose each other and inner walls 38c, 38d perpendicular to the inner walls 38a, 38b that oppose each other. The inner wall system 38 has an edge 56. The edge 56 of the inner wall system 38 is elevated from the floor 50 about the same as the ledge 48 of the outer wall system 36 is elevated from the floor 50. The printed circuit board 14 thus is disposed upon the edge 56 of the inner wall system 38. The inner chamber 54 extends through the body 16. The inner wall system 38 further includes a ledge 58. The ledge 58 is proximate the edge 56 and disposed inward toward the inner chamber 54 away from the perimeter 40 of the body 16. The inner wall system 38 can further include one or more heat stake posts 60 that extend from the edge 56 away from the second side 44 of the pressure sensor hub 10.

The body 16 of the pressure sensor hub 10 further includes a second inner wall system 62. The second inner wall system 62 extends from the floor 50 toward the second side 44 of the body 16. The second inner wall system 62 extends from the floor 50 in an opposite direction as the inner wall system 38. The second inner wall system 62 further defines the inner chamber 54, in addition to the inner wall system 38. The inner chamber 54 thus extends through the body 16. In embodiments such as those illustrated, the second inner wall system 62 is substantially circular. In other embodiments, the second inner wall system 62 is not substantially circular. In any event, the second inner wall system 62 includes portions 62a, 62b that oppose each other. The body 16 further includes one or more crossbars 64 that extend across the second inner wall system 62.

The body 16 of the pressure sensor hub 10 further includes a second outer wall system 66. The second outer wall system 66 extends from the outer flange 34 away from the first side 42 of the body 16. The second outer wall system 66 extends contiguously around the second inner wall system 62. In embodiments such as those illustrated, the second outer wall system 66 is substantially circular. In other embodiments, the second outer wall system 66 is not substantially circular. In any event, the second outer wall system 66 includes portions 66a, 66b that oppose each other. The second outer wall system 66 includes an edge 68, the second inner wall system 62 includes an edge 70, and each of the crossbars 64 includes an edge 72, respectively. All of the edges 68, 70, 72 can be coplanar.

The body 16 can be formed of any suitable material. Suitable materials for the body 16 include plastic or other non-electrically conductive materials.

To assemble the printed circuit board 14, the pressure sensor 12 is placed within the inner chamber 54. The sensing element 18 of the pressure sensor 12 is disposed upon the crossbars 64 that connect to the second inner wall system 62. In embodiments, an edge 74 of the sensing element 18 disposed furthest away from the electrical connector 20 of the pressure sensor 12 is disposed across the crossbars 64 within the inner chamber 54. The pressure sensor 12 is thus disposed at least partially within the inner chamber 54. The sensing element 18 is disposed within the inner chamber 54.

Figure 10:
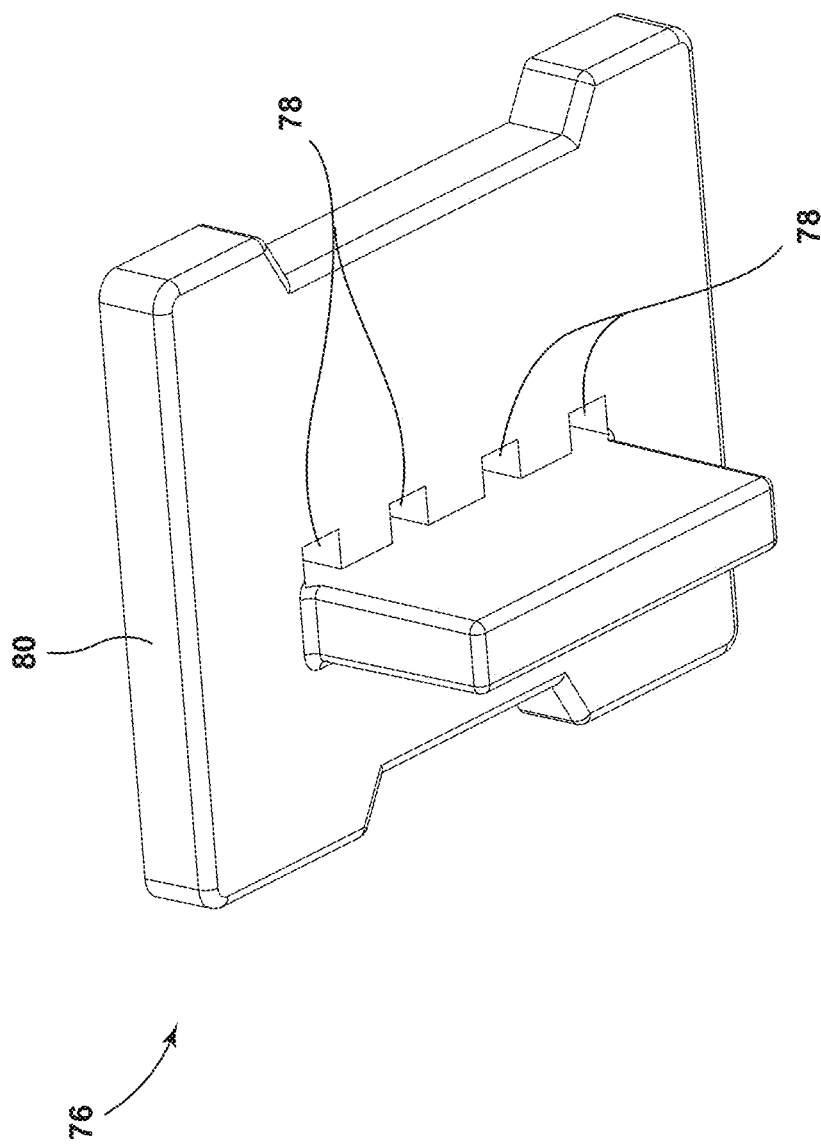
FIG. 10 is a perspective view of a seal of the pressure sensor hub of FIG. 1, illustrating the seal including one or more apertures through which the electrical connector of the pressure sensor extends.
Figure 11:
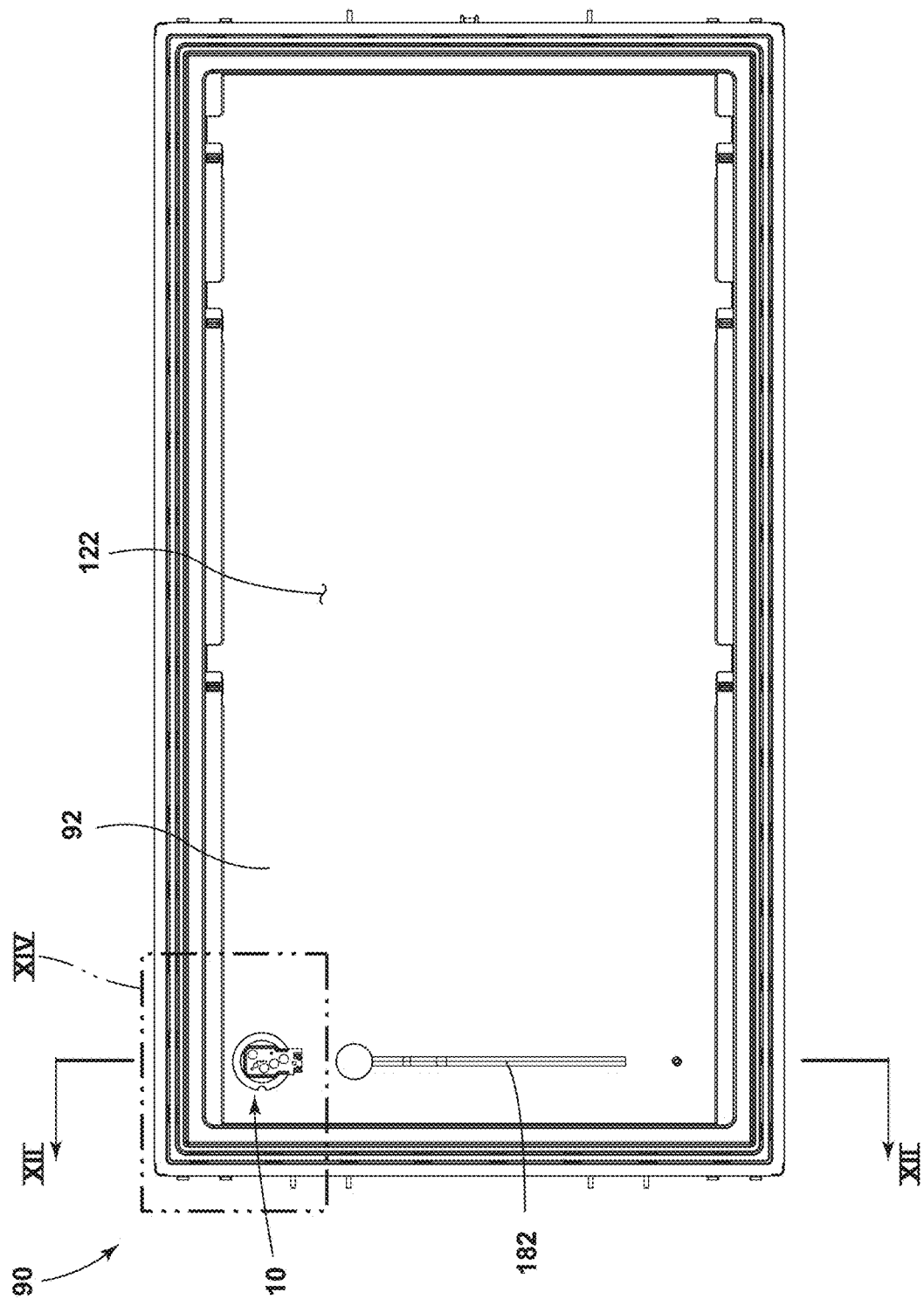
FIG. 11 is a view of a vacuum-insulated structure incorporating the pressure sensor hub of FIG. 1.
Figure 12:
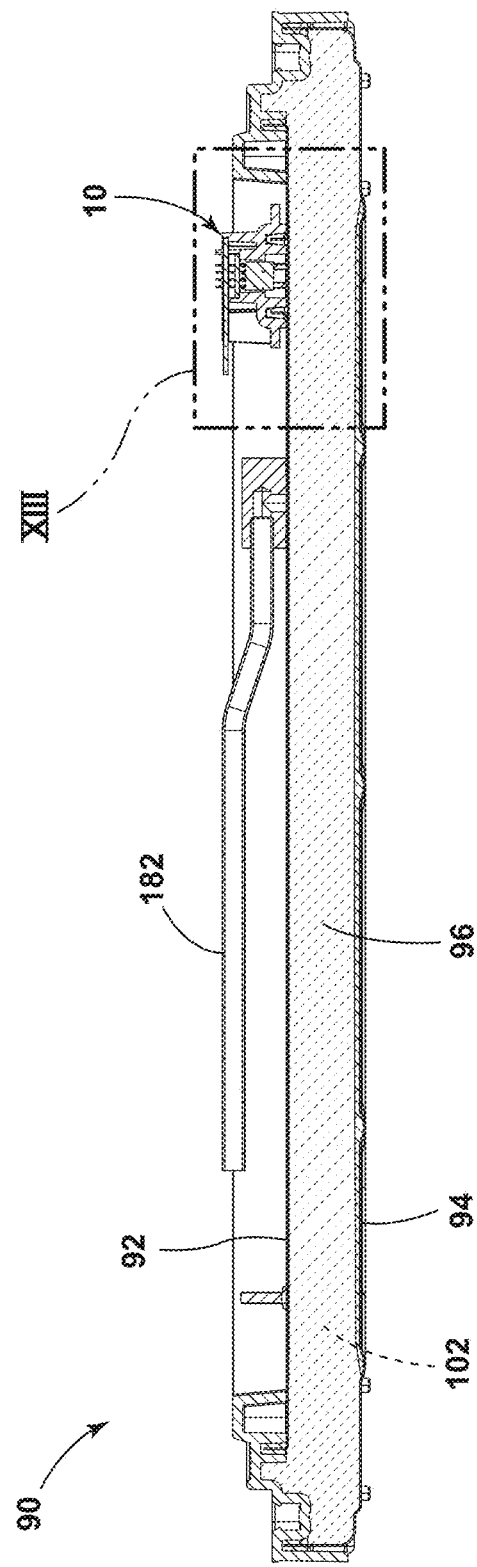
FIG. 12 is an elevation view of a cross-section of the vacuum-insulated structure of FIG. 11 taken through line XII-XII of FIG. 11, illustrating the vacuum-insulated structure further including the first liner to which the pressure sensor hub is attached, a second liner, and a space between the first liner and the second liner.
Figure 13:
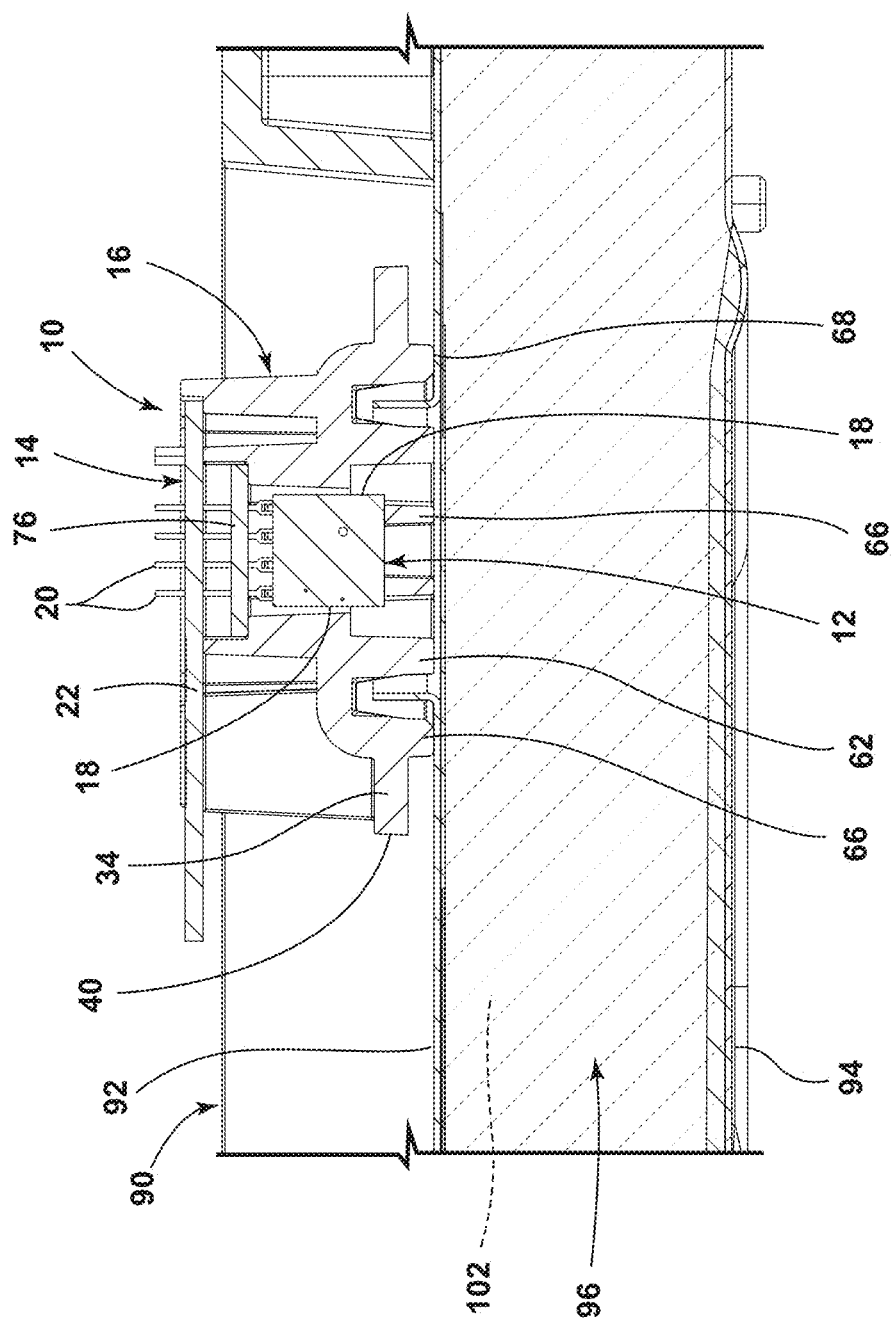
FIG. 13 is a magnified view of area XIII of FIG. 12, illustrating the sensing element of the pressure sensor in fluid communication with the space between the first liner and the second liner of the vacuum-insulated structure.
Figure 14:
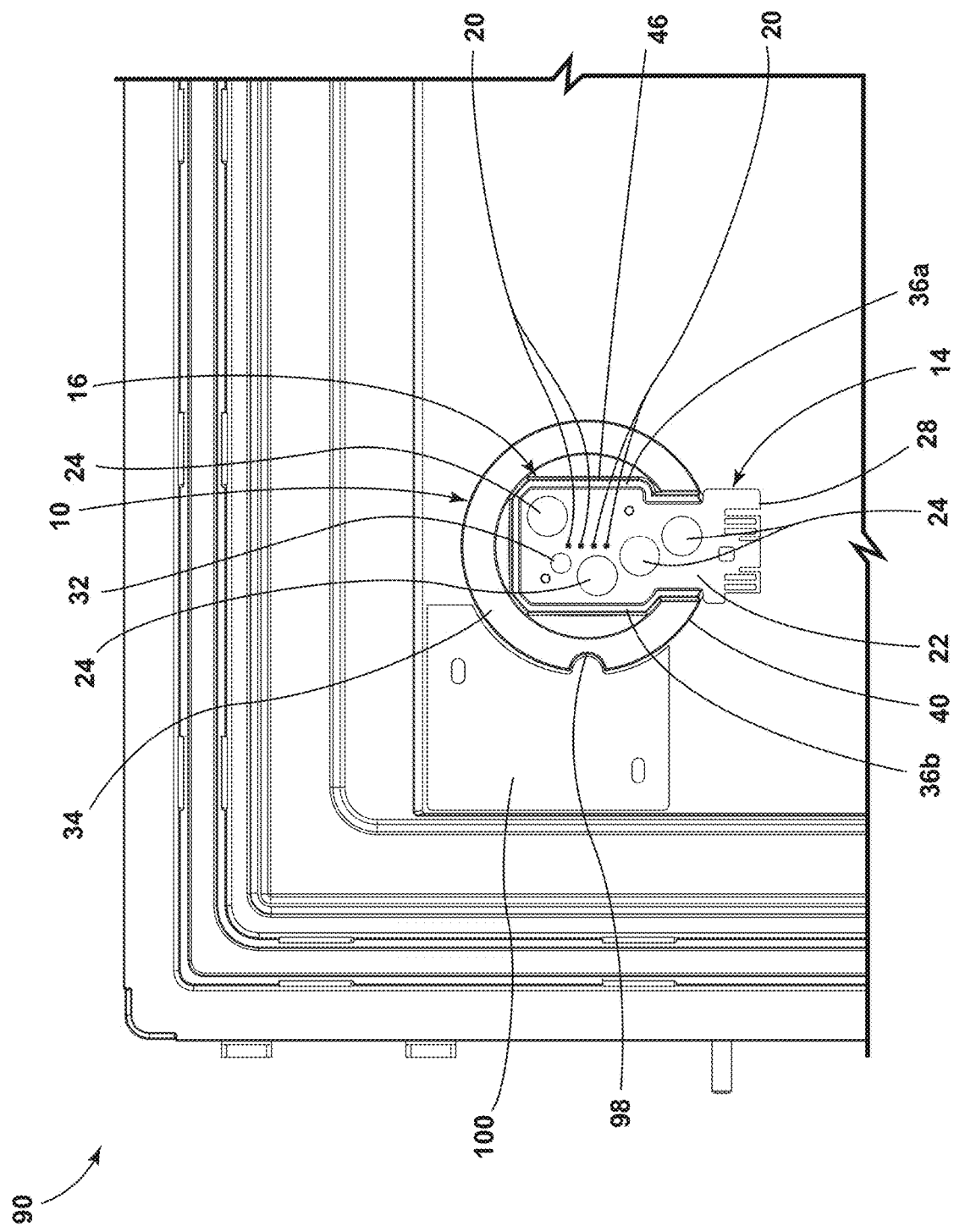
FIG. 14 is a magnified view of area XIV of FIG. 12, illustrating the one or more conductive pads of the printed circuit board of the pressure sensor hub being exposed to the external environment, and the first liner and the body of the pressure sensor hub each including a mating feature to ensure proper orientation of the pressure sensor hub on the first liner during installation.

Referring additionally to FIG. 10, the pressure sensor hub 10 can further include a seal 76 for the pressure sensor 12. The seal 76 includes one or more apertures 78 and has a perimeter 80 shaped to cover the inner chamber 54 inward of the inner wall system 38. The electrical connector 20 of the pressure sensor 12 is placed through the one or more apertures 78 of the seal 76. The seal 76 is disposed upon the ledge 58 of the inner wall system 38. The inner wall system 38 extends around the perimeter 80 of the seal 76. The electrical connector 20 of the pressure sensor 12 thus extends through the one or more apertures 78 of the seal 76.

The printed circuit board 14 is disposed upon the ledge 48 of the outer wall system 36 and opposes the floor 50 and the seal 76. The heat stake posts 60 extending from the inner wall system 38 are disposed through the heat stake apertures 30 through the substrate 22 of the printed circuit board 14. The edge 46 of the outer wall system 36 extends around at least a portion of the perimeter 26 of the printed circuit board 14. Due to the contour of the edge 46 of the outer wall system 36, and positioning of the heat stake apertures 30 through the printed circuit board 14 for the heat stake posts 60, the printed circuit board 14 can be attached to the body 16 of the pressure sensor hub 10 in only one orientation. That poke-yoke feature helps ensure correct assembly of the pressure sensor hub 10.

In embodiments where the printed circuit board 14 includes the edge connector 28, the edge 46 of the outer wall system 36 does not extend around the edge connector 28. The electrical connector 20 is placed to extend through one or more apertures 82 of the printed circuit board 14. A portion 84 of the electrical connector 20 is disposed within inner chamber 54 and a portion 86 is disposed outside of the inner chamber 54. The portion 86 of the electrical connector 20 disposed outside of the inner chamber 54 is exposed. The heat stake posts 60 can be melted over the printed circuit board 14 to secure the printed circuit board 14 to the pressure sensor hub 10.

The glue aperture 32 of the printed circuit board 14 is in communication with the inner chamber 54. Glue (not illustrated) can be inserted into the inner chamber 54 between the printed circuit board 14 and the seal 76 through the glue aperture 32 through the printed circuit board 14. "Glue" here includes any suitable sealing and bonding material such as cyanoacrylate, epoxy, and silicone, among other options. The glue provides an air-tight seal between the printed circuit board 14 and the seal 76 and prevents air leakage from the external environment into the inner chamber 54 past the seal 76 to the sensing element 18 of the pressure sensor 12. The glue further mechanically bonds the printed circuit board 14 to the body 16 of the pressure sensor hub 10. Excess glue can seep out of a glue weep hole 88 between the seal 76 and inner wall system 38. Incorporation of the glue weep hole 88 helps prevent glue from overflowing onto the one or more conductive pads 24 and avoids a need to mask the printed circuit board 14 during the deposition of the glue. Further, because the heat stake posts 60 attach the printed circuit board 14 to the body 16 of the pressure sensor hub 10, there is no need to clamp the printed circuit board 14 to the body 16 during insertion of the glue.

Referring now to FIGS. 11-14, in embodiments, the pressure sensor hub 10 is a component of a vacuum-insulated structure 90. The vacuum-insulated structure 90 further includes a first liner 92, a second liner 94, and a space 96 disposed between the first liner 92 and the second liner 94. The pressure sensor hub 10 is disposed on the first liner 92. The second side 44 of the body 16 of the pressure sensor hub 10 faces the first liner 92, and the first side 42 of the body 16 faces away from the first liner 92. The outer flange 34 of the body 16 of the pressure sensor hub 10 can include a mating feature 98 that cooperates with a mating feature 100 on the first liner 92 to ensure that the pressure sensor hub 10 is attached to the first liner 92 with the proper orientation. The sensing element 18 of the pressure sensor 12 is in fluid communication with the space 96 between the first liner 92 and the second liner 94. The first liner 92 and the second liner 94 are sealed together. During use of the vacuum-insulated structure 90, the space 96 has a pressure that is below atmospheric air pressure. The reduced pressure within the space 96 reduces heat transfer through the vacuum-insulated structure 90 compared to if the pressure within the space 96 was equal to atmospheric pressure. Core insulation material 102 can be disposed within the space 96 to further reduce heat transfer. The core insulation material 102 can be any suitable material, such as fumed silica. The pressure sensor hub 10 allows the pressure within the space 96 of the vacuum-insulated structure 90, as determined via output from the pressure sensor 12, to be monitored via electrical connection with the pressure sensor 12 via the one or more conductive pads 24 or edge connector 28 of the printed circuit board 14.

Figure 15:
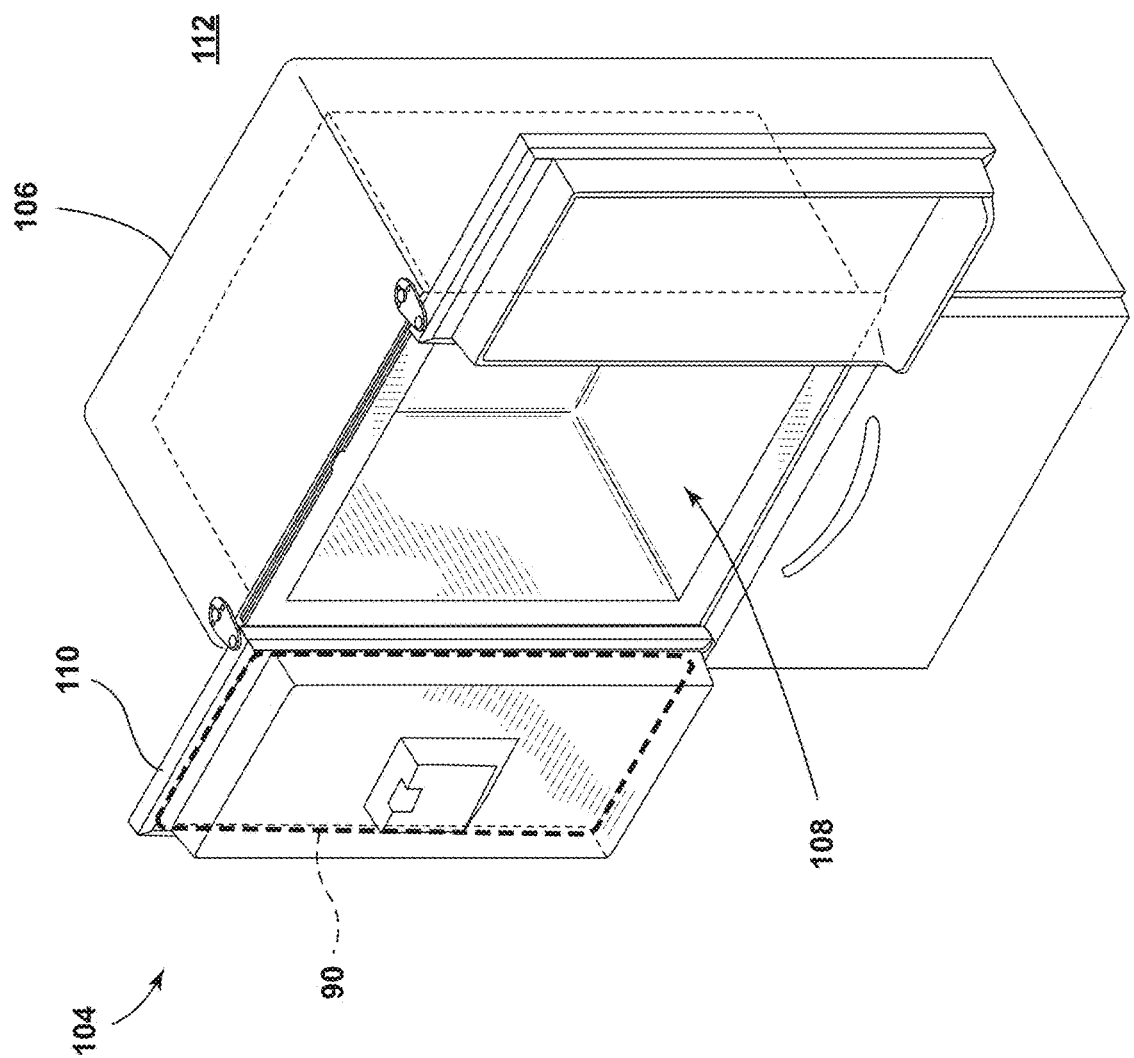
FIG. 15 is a perspective view of an appliance, specifically a refrigerator, incorporating the vacuum-insulated structure of FIG. 12 as a component of a door of the appliance.

Referring now to FIG. 15, in embodiments, the vacuum-insulated structure 90 is a component of an appliance 104, such as a refrigerator. The appliance 104 can include a cabinet 106 that defines a refrigerable compartment 108. The appliance 104 can further include a door 110 cooperating with the cabinet 106 to provide selective access to the refrigerable compartment 108 from an external environment 112. In embodiments, the vacuum-insulated structure 90 with the pressure sensor hub 10 of the present disclosure is a component of the door 110. In embodiments, the vacuum-insulated structure 90 with the pressure sensor hub 10 of the present disclosure is a component of the cabinet 106.

In use, electrical probes (not illustrated) of a device can be made to contact the one or more conductive pads 24 of the printed circuit board 14 of the pressure sensor hub 10. The electrical probes contacting the one or more conductive pads 24 form an electrical connection that allows output from the sensing element 18 of the pressure sensor 12 to transmit to a processor (not illustrated). A connection between a wire harness in electrical communication with the processor need not be made to monitor the pressure via the pressure sensor 12. The pressure sensor hub 10 can be utilized to monitor the pressure within the vacuum-insulated structure 90, such as while air is being withdrawn from the vacuum-insulated structure 90.

The vacuum-insulated structure 90 can then be incorporated into the appliance 104. Even when incorporated into the appliance 104, output from the pressure sensor 12 can be obtained via a connection with the edge connector 28 of the printed circuit board 14 of the pressure sensor hub 10 or some other form of connector, or with electrical probes as described. The pressure within the space 96 can thus be monitored as desired during the life of the appliance 104. It should be understood that the pressure sensor hub 10 can be a component of a precursor to the vacuum-insulated structure 90, such as a structure or insulated structure that is otherwise identical to the vacuum-insulated structure 90 but from which air has not yet been evacuated or does not include core insulation material 102. Such a structure or insulated structure is otherwise configured to become the vacuum-insulated structure 90 upon further manufacture.

According to a first aspect of the present disclosure, a pressure sensor hub for a vacuum-insulated structure comprises: (a) a pressure sensor, the pressure sensor comprising a sensing element and an electrical connector extending from the sensing element; (b) a printed circuit board comprising one or more conductive pads that are exposed, each of the one or more conductive pads in electrical communication with a different portion of the electrical connector of the pressure sensor; and (c) a body that supports the pressure sensor and the printed circuit board.

According to a second aspect of the present disclosure, the pressure sensor hub of the first aspect is presented, wherein the body comprises: (a) an outer flange defining a perimeter of the pressure sensor hub, a first side of the body, and a second side of the body that faces way from the first side, (b) an outer wall system extending from the outer flange away from the second side of the body, the outer wall system comprising (i) two outer walls that are spaced apart from each other and opposing each other, (ii) an outer wall generally orthogonal to the two outer walls and contiguous with the two outer walls, and (iii) a ledge proximate an edge of the outer wall system, wherein (i) the outer wall system defines an outer chamber further defined by a floor contiguous with the outer lip and (ii) the printed circuit board is disposed upon the ledge and opposes the floor and with the edge of the outer wall system extending around at least a portion of a perimeter of the printed circuit board, (c) an inner wall system extending from the floor away from the second side of the body within the outer chamber, the inner wall system comprising contiguous inner walls that define an inner chamber that extends through the body, (d) a second inner wall system extending from the floor toward the second side of the body, the second inner wall system comprising portions that oppose each other and further define the inner chamber that extends through the body, and (e) a second outer wall system extending from the outer flange away from the first side of the body, the second outer wall system extending contiguously around the second inner wall system, wherein the sensing element of the pressure sensor is disposed within the inner chamber.

According to a third aspect of the present disclosure, the pressure sensor hub of the second aspect is presented, wherein the electrical connector of the pressure sensor extends through one or more apertures of the printed circuit board, with a portion of the electrical connector being disposed outside of the inner chamber and exposed.

According to a fourth aspect of the present disclosure, the pressure sensor hub of any one of the second through third aspects is presented, wherein (i) the inner wall system further comprises a ledge proximate an edge of the inner wall system, the ledge disposed toward the inner chamber, (ii) the pressure sensor hub further comprises a seal that is disposed upon the ledge of the inner wall system and with the inner wall system extending around a perimeter of the seal, and (iii) the seal comprises one or more apertures through which the electrical connector of the pressure sensor extends.

According to a fifth aspect of the present disclosure, the pressure sensor hub of any one of the second through fourth aspects is presented, wherein the printed circuit board comprises a glue aperture in communication with the inner chamber.

According to a sixth aspect of the present disclosure, the pressure sensor hub of any one of the second through fifth aspects is presented, wherein (i) the inner wall system further comprises heat stake posts that extend from the edge away from the second side of the pressure sensor hub, and (ii) the printed circuit board comprises heat stake apertures through which the heat stake posts extend.

According to a seventh aspect of the present disclosure, the pressure sensor hub of any one of the first through sixth aspects is presented, wherein the printed circuit board further comprises an edge connector.

According to an eighth aspect of the present disclosure, the pressure sensor hub of any one of the first through seventh aspects is presented, wherein (i) one of the conductive pads is in communication with the supply voltage of the pressure sensor, and (ii) another one of the conductive pads is in communication with the signal voltage of the pressure sensor.

According to a ninth aspect of the present disclosure, the pressure sensor hub of any one of the first through eighth aspects is presented, wherein (i) the pressure sensor hub is a component of a vacuum-insulated structure, (ii) the vacuum-insulated structure further comprises a first liner, a second liner opposing the first liner, a space disposed between the first liner and the second liner, and (iii) the pressure sensor hub is disposed on the first liner with the sensing element of the pressure sensor in fluid communication with the space between the first liner and the second liner.

According to a tenth aspect of the present disclosure, the pressure sensor hub of the ninth aspect is presented, wherein the vacuum-insulated structure is a component of an appliance.

According to an eleventh aspect of the present disclosure, the pressure sensor hub of the tenth aspect is presented, wherein the appliance is a refrigerator.

According to a twelfth aspect of the present disclosure, the pressure sensor hub of the ninth aspect is presented, wherein the vacuum-insulated structure is a component of a door of a refrigerator.

According to a thirteenth aspect of the present disclosure, the pressure sensor hub of any one of the first through eighth aspect is presented, wherein (i) the pressure sensor hub is a component of a structure, (ii) the structure is configured to be a vacuum-insulated structure and comprises a first liner, a second liner opposing the first liner, and a space disposed between the first liner and the second liner, and (iii) the pressure sensor hub is disposed on the first liner with the sensing element of the pressure sensor in fluid communication with the space between the first liner and the second liner.

According to a fourteenth aspect of the present disclosure, a refrigerator comprises (a) a vacuum-insulated structure comprising a first liner, a second liner opposing the first liner, and a space disposed between the first liner and the second liner, wherein an air pressure within the space is less than atmospheric air pressure; and (b) a pressure sensor hub disposed on the first liner, the pressure sensor hub comprising (i) a pressure sensor in fluid communication with the space between the first liner and the second liner, (ii) a printed circuit board in electrical communication with the pressure sensor, and (iii) a body that supports the pressure sensor and the printed circuit board, wherein, the pressure sensor is configured to generate an electrical signal that varies as a function of the air pressure within the space.

According to a fifteenth aspect of the present disclosure, the refrigerator of the fourteenth aspect is presented, wherein the printed circuit board includes a substrate and one or more conductive pads supported by the substrate, each of the conductive pads being in electrical communication with the pressure sensor.

According to a sixteenth aspect of the present disclosure, the refrigerator of any one of the fourteenth through fifteenth aspects is presented, wherein the printed circuit board further comprises an edge connector configured to make a physical and electrical connection with a card edge connector of a wire harness.

According to a seventeenth aspect of the present disclosure, the refrigerator of any one of the fourteenth through sixteenth aspects is presented, wherein (i) the body includes an outer flange that defines a perimeter of the pressure sensor hub, and (ii) the outer flange of the body includes a mating feature that cooperates with a mating feature on the first liner to ensure that the pressure sensor hub is attached to the first liner with the proper orientation.

According to an eighteenth aspect of the present disclosure, the refrigerator of any one of the fourteenth through seventeenth aspects is presented, wherein the pressure sensor includes (i) a sensing element in fluid communication with the space between the first liner and the second liner and (ii) an electrical connector extending from the sensing element that transmits electrical signals from the sensing element, the electrical connector being in electrical communication with the one or more conductive pads of the printed circuit board.

According to a nineteenth aspect of the present disclosure, the refrigerator of the eighteenth aspect is presented, wherein (a) the body comprises (i) an outer flange defining a perimeter of the pressure sensor hub, a first side of the body that faces away from the first liner of the vacuum-insulated structure, and a second side of the body that faces away from the first side and toward the first liner, (ii) an inner wall system extending from the floor away from the second side of the body within the outer chamber, the inner wall system comprising contiguous inner walls that define an inner chamber that extends through body, and (iii) a second inner wall system extending from the floor toward the second side of the body, the second inner wall system comprising portions that oppose each other and further define the inner chamber that extends through the body, and (b) the sensing element of the pressure sensor is disposed within the inner chamber, (c) the inner wall system has an edge disposed away from the first liner and a ledge proximate the edge and disposed inward toward the inner chamber away from the perimeter of the body, and (d) the pressure sensor hub further comprises a seal for the pressure sensor, the seal disposed on the ledge of the inner wall system with the inner wall system extending around a perimeter of the seal, the seal comprising one or more apertures through which the electrical connector of the pressure extends.

According to a twentieth aspect of the present disclosure, the nineteenth aspect is presented, wherein (a) the body further comprises an outer wall system extending from the outer flange away from the second side of the body, the outer wall system comprising (i) two outer walls that are spaced apart from each other and opposing each other, (ii) an outer wall generally orthogonal to the two outer walls and contiguous with the two outer walls, and (iii) a ledge proximate an edge of the outer wall system, wherein (i) the outer wall system defines an outer chamber further defined by a floor contiguous with the outer lip and (ii) the printed circuit board is disposed upon the ledge and opposes the floor and with the edge of the outer wall system extending around at least a portion of a perimeter of the printed circuit board, and (b) the pressure sensor hub further comprises glue within the inner chamber of the body between the printed circuit board and the seal, the glue providing an air-tight seal between the printed circuit board and the seal and mechanically bonding the printed circuit board to the body of the pressure sensor hub.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The exemplary structures disclosed herein are for illustrative purposes and are not to be construed as limiting.

What is claimed is:

1. A pressure sensor hub for a vacuum-insulated structure comprising:
   a pressure sensor, the pressure sensor comprising a sensing element and an electrical connector extending from the sensing element;
   a printed circuit board comprising one or more conductive pads that are exposed, each of the one or more conductive pads in electrical communication with a different portion of the electrical connector of the pressure sensor; and
   a body that supports the pressure sensor and the printed circuit board.

2. The pressure sensor hub of claim 1, wherein the body comprises:
   an outer flange defining a perimeter of the pressure sensor hub, a first side of the body, and a second side of the body that faces away from the first side,
   an outer wall system extending from the outer flange away from the second side of the body, the outer wall system comprising (i) two outer walls that are spaced apart from each other and opposing each other, (ii) an outer wall generally orthogonal to the two outer walls and contiguous with the two outer walls, and (iii) a ledge proximate an edge of the outer wall system, wherein (i) the outer wall system defines an outer chamber further defined by a floor contiguous with the outer flange and (ii) the printed circuit board is disposed upon the ledge and opposes the floor and with the edge of the outer wall system extending around at least a portion of a perimeter of the printed circuit board,
   an inner wall system extending from the floor away from the second side of the body within the outer chamber, the inner wall system comprising contiguous inner walls that define an inner chamber that extends through body,
   a second inner wall system extending from the floor toward the second side of the body, the second inner wall system comprising portions that oppose each other and further define the inner chamber that extends through the body, and
   a second outer wall system extending from the outer flange away from the first side of the body, the second outer wall system extending contiguously around the second inner wall system, wherein the sensing element of the pressure sensor is disposed within the inner chamber.

3. The pressure sensor hub of claim 2, wherein
   the electrical connector of the pressure sensor extends through one or more apertures of the printed circuit board, with a portion of the electrical connector being disposed outside of the inner chamber and exposed.

4. The pressure sensor hub of claim 2, wherein
   the inner wall system further comprises a ledge proximate an edge of the inner wall system, the ledge disposed toward the inner chamber,
   the pressure sensor hub further comprises a seal that is disposed upon the ledge of the inner wall system and with the inner wall system extending around a perimeter of the seal, and
   the seal comprises one or more apertures through which the electrical connector of the pressure sensor extends.

5. The pressure sensor hub of claim 2, wherein
   the printed circuit board comprises a glue aperture in communication with the inner chamber.

6. The pressure sensor hub of claim 2, wherein
   the inner wall system further comprises heat stake posts that extend from the edge away from the second side of the pressure sensor hub, and
   the printed circuit board comprises heat stake apertures through which the heat stake posts extend.

7. The pressure sensor hub of claim 1, wherein
   the printed circuit board further comprises an edge connector.

8. The pressure sensor hub of claim 1, wherein
   one of the conductive pads is configured to provide supply voltage of the pressure sensor, and
   another one of the conductive pads is configured to receive signal voltage of the pressure sensor.

9. The pressure sensor hub of claim 1, wherein
   the pressure sensor hub is a component of a structure,
   the structure is configured to be a vacuum-insulated structure and comprises a first liner, a second liner opposing the first liner, and a space disposed between the first liner and the second liner, and the pressure sensor hub is disposed on the first liner with the sensing element of the pressure sensor in fluid communication with the space between the first liner and the second liner.

10. A vacuum-insulated structure comprising:
a first liner, a second liner opposing the first liner, and a space disposed between the first liner and the second liner; and
a pressure sensor hub is disposed on the first liner, the pressure sensor hub comprising:
  a pressure sensor, the pressure sensor comprising a sensing element and an electrical connector extending from the sensing element;
  a printed circuit board comprising one or more conductive pads that are exposed, each of the one or more conductive pads in electrical communication with a different portion of the electrical connector of the pressure sensor; and
  a body that supports the pressure sensor and the printed circuit board,
wherein, the sensing element of the pressure sensor is in fluid communication with the space between the first liner and the second liner.

11. The vacuum-insulated structure of claim 10, wherein the vacuum-insulated structure is a component of an appliance.

12. A refrigerator comprising:
a vacuum-insulated structure comprising a first liner, a second liner opposing the first liner, and a space disposed between the first liner and the second liner, wherein an air pressure within the space is less than atmospheric air pressure; and
a pressure sensor hub disposed on the first liner, the pressure sensor hub comprising (i) a pressure sensor in fluid communication with the space between the first liner and the second liner, (ii) a printed circuit board in electrical communication with the pressure sensor, and (iii) a body that supports the pressure sensor and the printed circuit board,
wherein, the pressure sensor is configured to generate an electrical signal that varies as a function of the air pressure within the space.

13. The refrigerator of claim 12, wherein the printed circuit board includes a substrate and one or more conductive pads supported by the substrate, each of the conductive pads being in electrical communication with the pressure sensor.

14. The refrigerator of claim 13 further comprising:
a cabinet that defines a refrigerable compartment; and
a door cooperating with the cabinet to provide selective access to the refrigerable compartment from an external compartment,
wherein, the door comprises the vacuum-insulated structure.

15. The refrigerator of claim 13, wherein the pressure sensor includes (i) a sensing element in fluid communication with the space between the first liner and the second liner and (ii) an electrical connector extending from the sensing element that transmits electrical signals from the sensing element, the electrical connector being in electrical communication with the one or more conductive pads of the printed circuit board.

16. The refrigerator of claim 15, wherein the body comprises:
  an outer flange defining a perimeter of the pressure sensor hub, a first side of the body that faces away from the first liner of the vacuum-insulated structure, and a second side of the body that faces away from the first side and toward the first liner,
  an outer wall system extending from the outer flange away from the second side of the body, the outer wall system comprising (i) two outer walls that are spaced apart from each other and opposing each other, (ii) an outer wall generally orthogonal to the two outer walls and contiguous with the two outer walls, and (iii) a ledge proximate an edge of the outer wall system, wherein (i) the outer wall system defines an outer chamber further defined by a floor contiguous with the outer flange and (ii) the printed circuit board is disposed upon the ledge and opposes the floor and with the edge of the outer wall system extending around at least a portion of a perimeter of the printed circuit board,
  an inner wall system extending from the floor away from the second side of the body within the outer chamber, the inner wall system comprising contiguous inner walls that define an inner chamber that extends through body, and
  a second inner wall system extending from the floor toward the second side of the body, the second inner wall system comprising portions that oppose each other and further define the inner chamber that extends through the body,
the sensing element of the pressure sensor is disposed within the inner chamber,
the inner wall system has an edge disposed away from the first liner and a ledge proximate the edge and disposed inward toward the inner chamber away from the perimeter of the body, and
the pressure sensor hub further comprises a seal for the pressure sensor, the seal disposed on the ledge of the inner wall system with the inner wall system extending around a perimeter of the seal, the seal comprising one or more apertures through which the electrical connector of the pressure extends.

17. The refrigerator of claim 16, wherein the pressure sensor hub further comprises glue within the inner chamber of the body between the printed circuit board and the seal, the glue providing an air-tight seal between the printed circuit board and the seal and mechanically bonding the printed circuit board to the body of the pressure sensor hub.

18. The refrigerator of claim 13 further comprising:
a cabinet that defines a refrigerable compartment; and
a door cooperating with the cabinet to provide selective access to the refrigerable compartment from an external compartment,
wherein, the cabinet comprises the vacuum-insulated structure.

19. The refrigerator of claim 12, wherein the printed circuit board further comprises an edge connector configured to make a physical and electrical connection with a card edge connector of a wire harness.

20. The refrigerator of claim 12, wherein the body includes an outer flange that defines a perimeter of the pressure sensor hub, and
the outer flange of the body includes a mating feature that cooperates with a mating feature on the first liner to ensure that the pressure sensor hub is attached to the first liner with the proper orientation.

* * * * *